United States Patent [19]

Baillet

[11] 3,919,659

[45] Nov. 11, 1975

[54] DEVICE FOR AMPLIFYING THE ALTERNATING COMPONENT OF A VARIABLE SIGNAL HAVING A CONTINUOUS COMPONENT

[75] Inventor: Gerard Eugene Baillet, Choisy-le-Roi, France

[73] Assignee: Societe Anonyme de Telecommunications, France

[22] Filed: July 20, 1973

[21] Appl. No.: 380,973

[30] Foreign Application Priority Data

July 26, 1972 France .............................. 72.26886

[52] U.S. Cl. ....................... 330/86; 330/85; 330/24; 330/35; 330/3

[51] Int. Cl.$^2$ ........................................... H03F 1/36

[58] Field of Search ..................... 330/85, 51, 9, 86; 328/127, 128

[56] References Cited

UNITED STATES PATENTS

| | | | |
|---|---|---|---|
| 3,667,055 | 5/1972 | Uchida | 328/127 |
| 3,737,798 | 6/1973 | Faraguet et al. | 330/51 X |
| 3,801,919 | 4/1974 | Wilkes et al. | 330/51 X |

*Primary Examiner*—Nathan Kaufman

[57] ABSTRACT

A device for amplifying the alternating component of a variable signal having a continuous component comprising a branch circuit including an integrator of the amplified input signal and a unit gain memory provided with a pair of control terminals, one of the control terminals permitting the application to the input signal of the instantaneous voltage available at the output terminals of the integrator, and the other control terminal permitting the application to the input signal of the value (retained by the memory) of the voltage available at the output terminals of the integrator at the instant at which said other terminal is actuated.

1 Claim, 5 Drawing Figures

DEVICE FOR AMPLIFYING THE ALTERNATING COMPONENT OF A VARIABLE SIGNAL HAVING A CONTINUOUS COMPONENT

The invention relates to a device for amplifying the alternating component of a variable signal having a continuous component.

The main object of the invention is to permit the highly amplified transmission of the alternating component of a variable input signal, however weak the rhythm of this variation be, and to interrupt the transmission of the continuous component of the input signal, whatever be the importance of the contribution of this component to the peak value of the input signal.

To this end, the device according to the invention comprises a branch circuit including an integrator of the voltage of the amplified input signal and a unit gain memory provided with a pair of control terminals, one of said control terminals permitting the application to the input signal of the instantaneous voltage available at the output terminals of the integrator and the other control terminal permitting the application to the input signal of the value (retained by the memory) of the voltage available at the output terminals of the integrator at the instant said other terminal is actuated.

The device according to the invention therefore permits measuring the mean value of the input signal by means of the integrator and applying said means value to the input signal at the instant the measured amplification of the input signal is started. As this mean value is deducted from the continuous component of the input signal, it is possible to amplify the sole alternating component. The instantaneous value available at the terminals of the integrator may also be subtracted from the input signal.

The means for applying this correction voltage to the input signal may be constituted by a unit gain memory provided with a pair of control terminals.

The invention will be better understood from the ensuring description with reference to the accompanying drawing in which.

Figure 1:
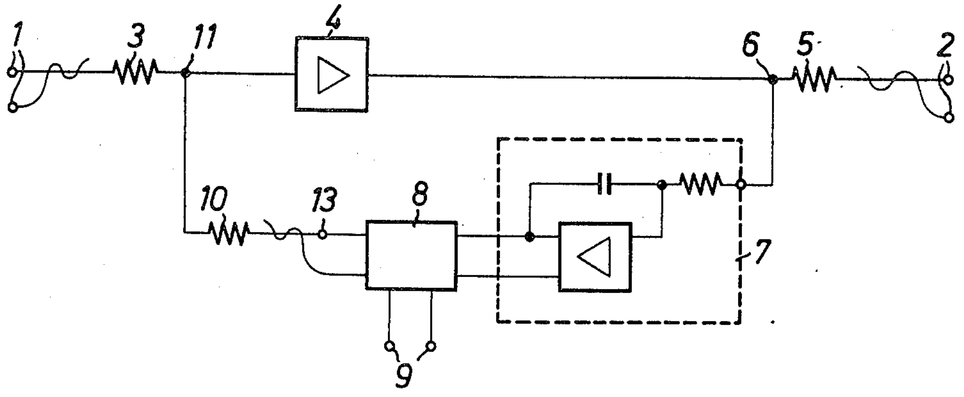
FIG. 1 is a block diagram of a device according to the invention.

With reference first to FIG. 1, the device according to the invention comprises, in series between two input terminals 1 and two output terminals 2, a resistor 3 of moderate value, an amplifier 4 having a constant gain within a frequency band $0 \leqslant f \leqslant fs$ ($fs$ being a cut-off frequency, higher than the highest frequency of the spectrum of the input signal), the amplifier 4 being of high input impedance and zero output impedance, a resistor 5 of low value and, connected to the common point 6 between the resistor 5 and the amplifier 4, the input of a chain of elements comprising an integrator with respect to time 7 feeding a unit gain memory circuit 8 provided with a pair of control terminals 9, the output of the memory circuit being connected, through a resistor 10 of moderate value, to the input of the amplifier 4.

The control means 9 in the form of a switching arrangement is operated only during the time that measurements are actually being carried out. When the control means 9 is not actuated, the value stored in the memory changes instantaneously, but is not applied to the input signal. When, on the other hand, the control means 9 is actuated, the last value stored in the memory is applied to the input signal.

With this arrangement, the amplifier 4 is capable of amplifying, for example 200 times, not only the continuous component but the alternating component of the voltage applied to its input. The integrator 7 integrates with respect to time the output voltage of the amplifier 4. At its output there is a d-c voltage which is applied to memory circuit 8. Since the latter has unity gain, as mentioned above, this same d-c voltage applied to the input of memory circuit 8, also appears at the output of this memory circuit.

This voltage has, owing to the properties of the integrator 7, the opposite sign to the output voltage of the amplifier 4 and is consequently of opposite sign to the d-c voltage applied to the input terminals.

Figure 4:
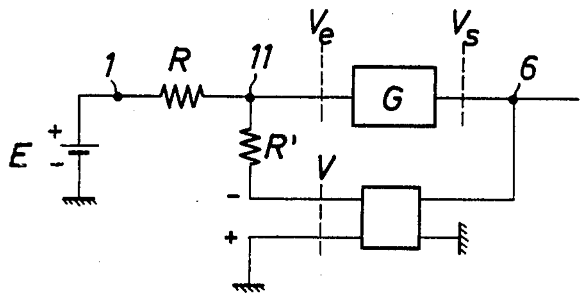
FIG. 4 is an equivalent diagram of the device shown in FIG. 1.

This situation can be given an equivalent schematic representation (FIG. 4) which gives a better explanation of the operation of the circuit.

The following relations may be written:

$$Ve = E \frac{R'}{R + R'} - V \frac{R}{R + R'}$$

$$Vs = GVe$$

$$V = \frac{1}{K} \int_o^t Vs\,dt$$

Thus:

$$GE = \frac{R'}{R + R'} = Vs + \frac{1}{K} \frac{G R}{-R + R'} \int_o^t Vs\,dt$$

Whence:

$$Vs = GE \frac{R'}{R + R'} \text{exp.} \left(\frac{1}{K} \frac{G R}{R + R'} t\right)$$

Figure 2:
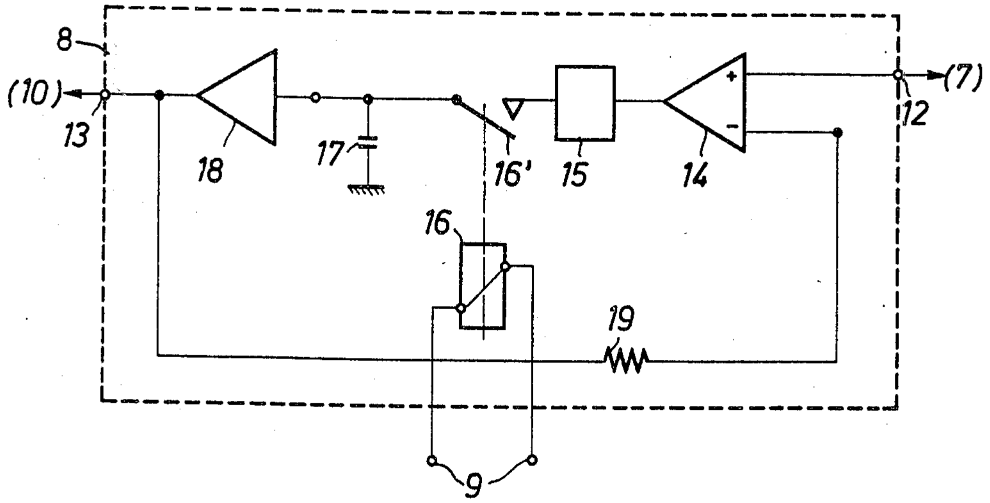
FIG. 2 is a block diagram of a memory circuit having control terminals which is part of the device shown in FIG. 1.

Thus is permanent operation ($t \rightarrow \infty$), it becomes $Vs = 0$ and consequently $V = E\,(R'/R)$ With reference to FIG. 2, the memory circuit 8 is constituted between an input terminal 12 connected to the loaded line of the integrator 7 and an output terminal 13 connected to the resistor 10 by a first amplifier 14, a high-gain differential amplifier connected to the input terminal 12 on its direct input conductor, a phase corrector 15, the at-rest contact 16′ of a relay 16 connected to the control terminals 9, a branch connected capacitor 17, a second amplifier 18 having unit gain and having a high input impedance, the output of the second amplifier 18 being connected through a resistor 19 to the inverted input connector of the first amplifier.

With this circuit arrangement, when the at-rest contact 16' is made, the circuitry of the amplifiers of the memory circuit 8 produces a total negative feedback from the output 13 of the second amplifier 18 to the input of the first amplifier 14. The voltage between the direct and inverted input conductors of the amplifier 14 is very low and the voltage gain of the circuit between its terminals 12 and 13 is very near to unit gain.

Figure 5:
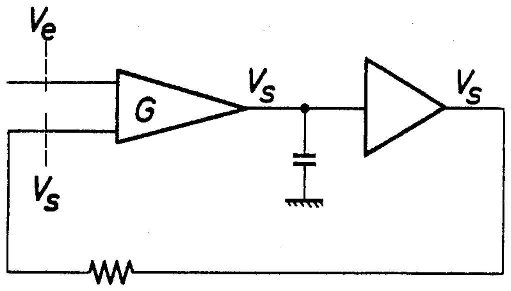
FIG. 5 is a simplified equivalent diagram of the diagram shown in FIG. 4.

In a simplified equivalent schematic representation (FIG. 5) there is obtained:

$G\,(Ve - Vs) = Vs$ $$Vs = \frac{G}{1+G}\,Ve \sim Ve$$

This relation shows that the voltage Ve of the input terminal 12 is to be formed at the output terminal 13 and also at the terminals of the capacitor 17 which is the memory element of the circuit.

The phase corrector network 15 ensures stability of the circuit. When the at-rest contact 16' of the relay 16 is broken, the voltage at the terminals of the capacitor 17 has the value obtained at the moment of breaking the contact 16'. The amplifier 18 has a very high input impedance and the voltage at the terminals of capacitor 17 no longer varies. The unit gain amplifier 18 retransmits this voltage in value and sign to the output terminal 13 of the circuit.

It is clear that the device according to the invention furnishes at its output terminals 2 a d-c voltage of value:

$$Vs = \frac{G\,(ER' - VR)}{R + R'}$$

regardless of the made or broken state of the connection ensured by the at-rest contact 16' of the relay 16, any alternating component of the voltage applied to the input terminals 1 of the device according to the invention is received, amplified by the amplifier 4 at the output terminals 2, the gain G of this amplifier being constant in the closed interval $0 \leq f \leq fs$ or in the half-open interval $0 < f \leq fs$ respectively in accordance with the aforementioned state of the relay 16.

Figure 3:
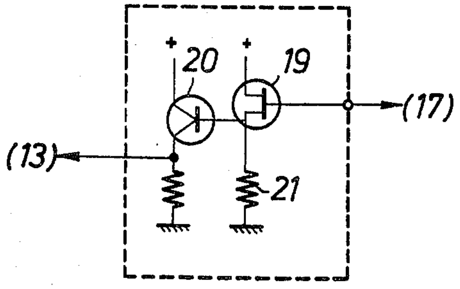
FIG. 3 is a circuit diagram of an amplifier of the circuit shown in FIG. 2.

In a preferred embodiment of the device according to the invention (FIGS. 2 and 3), the second amplifier 18 is constituted, from the input to the output, by a first field-effect transistor 19 and a second ordinary transistor 20 which are common-collector connected. The function of the second transistor 20 is to reduce the apparent resistance of the resistor 21 of the circuit of the field-effect transistor 19.

The device according to the invention may be advantageously employed with a known monoline scanning infra-red analysis device, the determination of the mean correction value being effected in the course of a prior scanning. The input signal has in this case a continuous component of 5–6 V on average whereas the alternating signal has an amplitude of the order of 5 mV and a maximum frequency (*fs*) of the order of 1 MHz. The amplifier 4 has for example a gain of 200. The amplified output signal at the terminals 2 is therefore between about + and − 1 V with respect to the earth. The correction signal issuing from the memory 8, in the period of determination of the correction value, is opposed to the input signal and has a mean value of −5 to 6 V in the period of effective amplification, the voltage at the output of the integrator is generally between + and −15 V.

What I claim is:

1. An arrangement for amplifying the alternating component of a variable signal having a continuous component, comprising amplifying means with input connected to the source of said signal; integrating means with input connected to the output of said amplifying means; and memory means with unit gain connected in series with the output of said integrating means, the output of said memory means being connected to the input of said amplifying means, said memory means having control means for applying the instantaneous output of said integrating means to the input of said amplifying means when in the inoperative state, said control means being actuated in the operative state for applying to the input of said amplifying means the output of said integrating means and held in memory by said memory means at the instant that said control means is actuated, said output of said integrating and held in memory by said memory means comprising the mean value of said signal, said memory comprising a high gain differential amplifier with input connected to the loaded output of said integrating means, a phase corrector connected to the output of said differential amplifier, a relay with normally open contact connected to the output of said phase corrector, the coil of said relay being connected to said control means, an amplifier with unit gain and with high input impedance connected to said contact of said relay, resistor means between the output of said amplifier with unit gain and the other input of said differential amplifier, and a memory capacitor connected to the input of said amplifier with unit gain, said amplifier with unit gain comprising a field effect transistor followed by an auxiliary transistor, said two transistors being connected in common-collector circuit.

* * * * *